United States Patent [19]
Kim

[11] Patent Number: 5,646,743
[45] Date of Patent: Jul. 8, 1997

[54] METHOD FOR FORMATTING A VIDEOTAPE AND RECORDING/REPRODUCING TO/FROM THE FORMATTED VIDEOTAPE

[75] Inventor: Kwang Kook Kim, Seoul, Rep. of Korea

[73] Assignee: Samsung Electronics Co., Ltd., Kyungki-do, Rep. of Korea

[21] Appl. No.: 831,962

[22] Filed: Feb. 6, 1992

[30] Foreign Application Priority Data

Feb. 6, 1991 [KR] Rep. of Korea .................. 91-2032

[51] Int. Cl.$^6$ .................................................. H04N 5/782
[52] U.S. Cl. ................. 386/57; 360/14.2; 360/33.1; 360/48; 360/72.2
[58] Field of Search .................. 358/335, 310; 360/33.1, 137, 14.1, 14.2, 48, 72.1, 72.2; H04N 5/76, 5/78, 5/782

[56] References Cited

U.S. PATENT DOCUMENTS

| | | | |
|---|---|---|---|
| 4,544,960 | 10/1985 | Konishi | 358/335 |
| 4,734,792 | 3/1988 | Maeda et al. | 358/335 |
| 5,140,435 | 8/1992 | Suzuki et al. | 358/335 |

FOREIGN PATENT DOCUMENTS 0393955  10/1990  European Pat. Off. .

*Primary Examiner*—Khoi D. Truong
*Attorney, Agent, or Firm*—Sughrue, Mion, Zinn, Macpeak & Seas

[57] ABSTRACT

A program filing method for a video tape recorder is disclosed. The tape is formatted into a number of regions so that the tape is arranged into a filing form, and thus, recording and reproduction is faster and more convenient by utilizing a VISS function. When a vacant tape is inserted, the total length of the tape is divided into a number of regions based on the desired formatting number, and VISS signals are recorded on each of the regions for several seconds, so that recording and reproduction can be carried out by selecting the formatted region number, thus making it possible to carry out recording or reproduction on the desired regions.

5 Claims, 3 Drawing Sheets

METHOD FOR FORMATTING A VIDEOTAPE AND RECORDING/REPRODUCING TO/FROM THE FORMATTED VIDEOTAPE

FIELD OF THE INVENTION

The present invention relates to a program filing method for a video tape recorder (VTR), and particularly to a program filing method using a VISS (VHS index search system) function, in which recording is carried out on a predetermined portion of the tape after formatting the tape, and reproduction of a desired portion of the tape can be carried out in a speedy manner.

BACKGROUND OF THE INVENTION

Generally, the currently used video tape recorders are undergoing a trend of diversification in functions, so that video tape recorders become more convenient to use. However, a function of selecting and reproducing desired portions of the recorded information based on the desire of the user has not been realized yet.

Thus, in spite of the developments and applications of other functions, the technique of searching and reading a specific desired information in order to reproduce it has not yet been fully developed the initial stage of the VTR technique.

SUMMARY OF THE INVENTION

An object of the present invention is to provide a program filing method for a video tape recorder in which filling format information is recorded on a blank tape later, so that a predetermined portion of the program information later can be speedily reproduced, or recording can be carried out on a particular region of the tape base on the filling format information.

According to the present invention, there is provided a program filing method for a video tape recorder including the steps of recognizing a mode of operation receiving by a desired filing format information number after discriminating whether a file key or a formatting key has been input after insertion of a tape into the video tape recorder; carrying out a recording operation into the desired file indicated by the filing format information number if a file key has been input by detecting video signals or VISS signals reproducing only the desired file indicated by the filing format information number if a file key has been input by detecting video signals or VISS signals, and carrying out a formatting mode based on the desired filing format information number if a formatting key has been input.

BRIEF DESCRIPTION OF THE DRAWINGS

The above object and other advantages of the present invention will become more apparent by describing in detail the preferred embodiment of the present invention with reference to the attached drawings, in which.

DESCRIPTION OF THE PREFERRED EMBODIMENT

Figure 1:
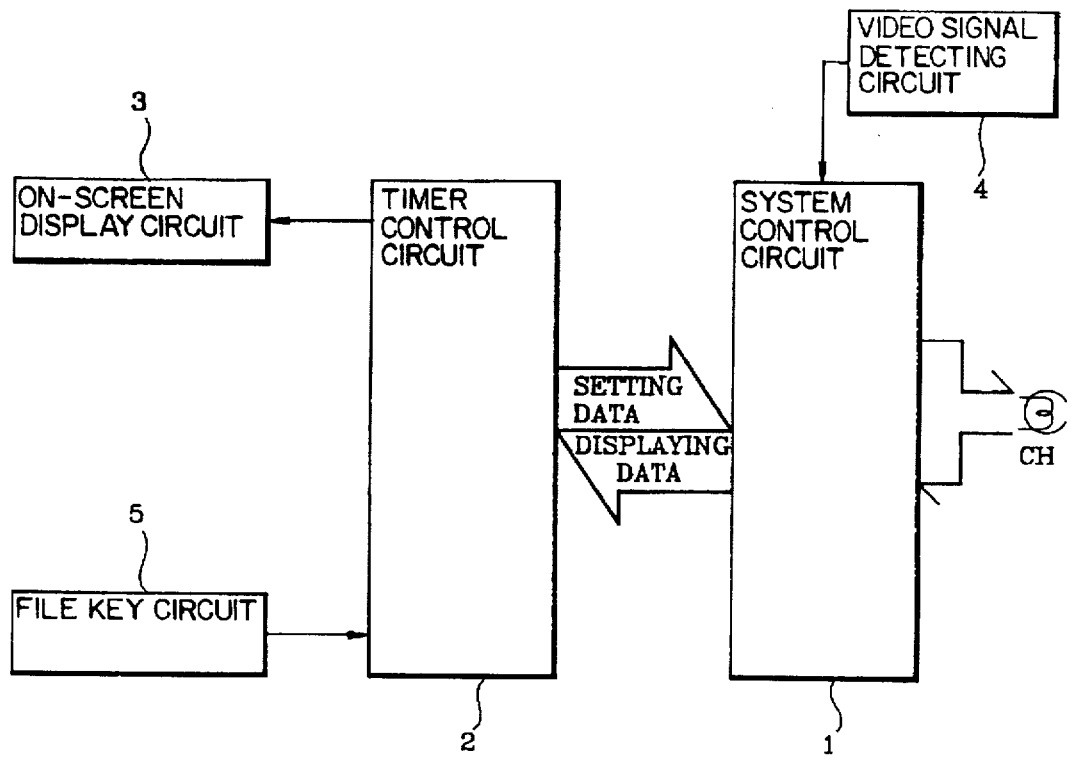
FIG. 1 illustrates the constitution of the hardware for carrying out a program filing method according to the present invention.

FIG. 1 illustrates the constitution of a servo circuit system for a video tape recorder. The system includes an OSD part 3 (on-screen display) 3 for displaying letters, a timer control circuit 2 for carrying out instructions corresponding to an operation mode in accordance with the turning-on of a key, a system control circuit 1 for controlling system functions such as play, Stop, FF, REW and record, a video signal detecting circuit 4 for detecting video signals from the tape, and a control head CH.

The system hardware further comprises a file key circuit 5 including a separate formatting key and a file key.

The system control circuit 1 receives setting data from the timer control circuit 2, and detected signals from the video signal detecting circuit 4 in order to input them into the control head CH. Further, the system control circuit 1 reads the data on the tape control tracks through the control head CH in order to furnish display data to the timer control circuit 2.

The timer control circuit 2 furnishes display data to the OSD part 3 so that data can be displayed. The file key circuit 5 includes a formatting key and a file key sets regions for tape formatting, for reproducing and recording using the system control circuit 1 through the timer control circuit 2.

The hardware described above is used for carrying out the method for filing a program according to the present invention.

Figure 2A:
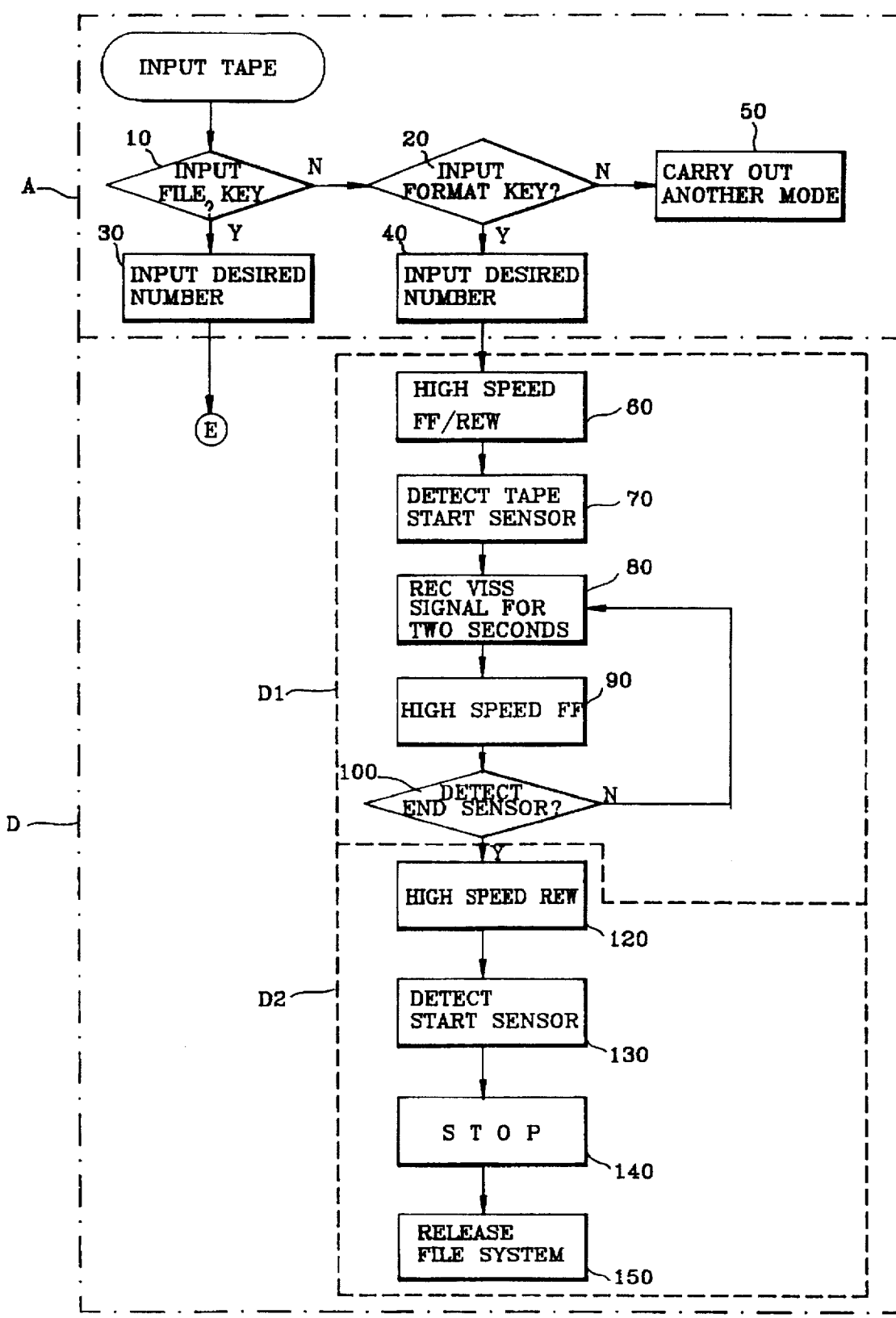
FIGS. 2A and 2B are flow charts showing the program filing method for a video tape recorder according to the present invention.
Figure 2B:
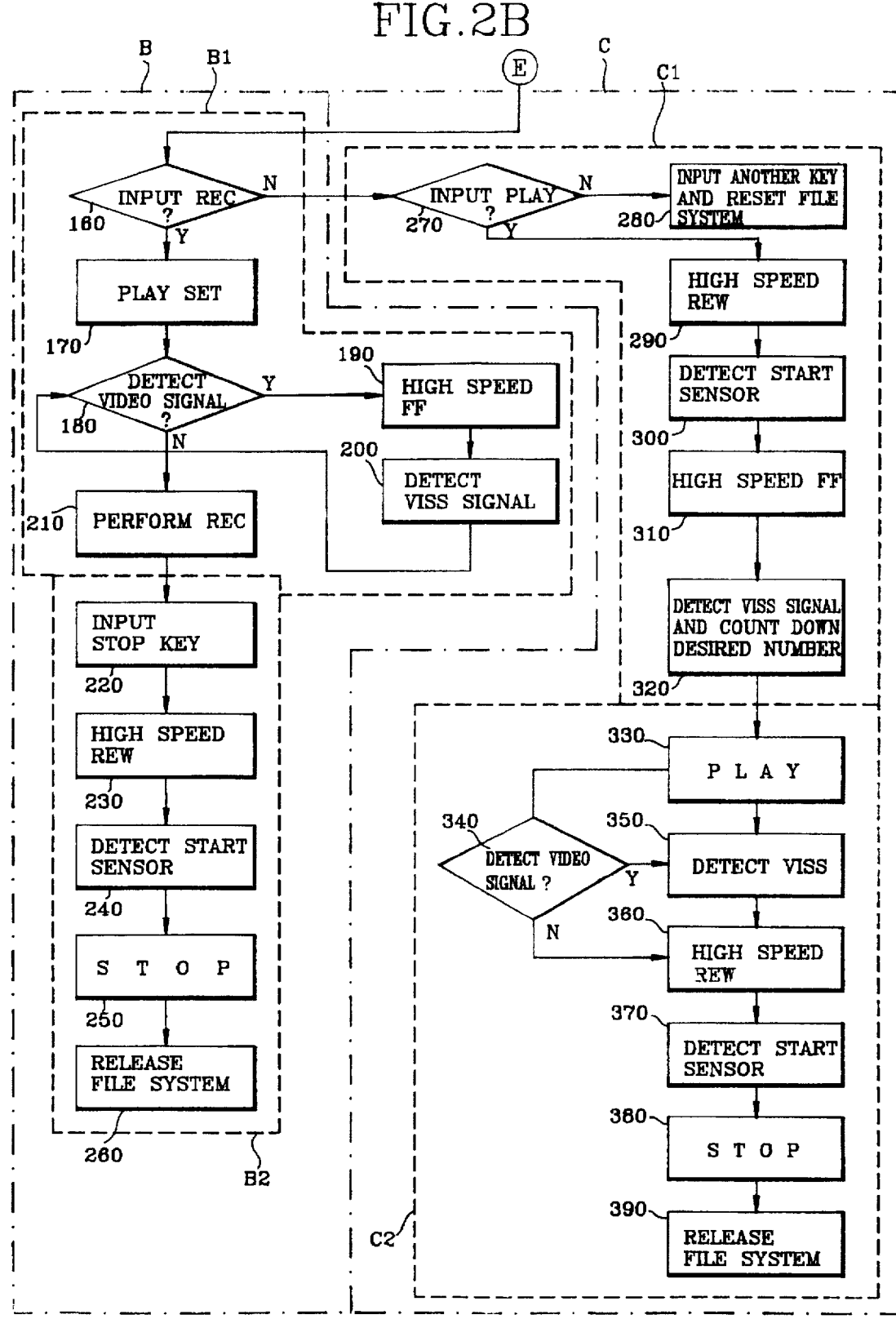

As shown in FIGS. 2A and 2B, the method for filing a program includes a step A of recognizing a desired operation mode by inputting a desired file format information number after discerning whether a file key or a formatting key has been input once a tape is inserted into the VCR, a step B for carrying out recording by detecting video signals or VISS signals when a recording/reproducing mode has been discerned in the first step A a step C for reproducing only a desired portion of the tape by detecting video signals and VISS signals when a recording/reproducing mode has been discerned in step A after counting up the desired number by detecting VISS signals after carrying out the first step A; and a step D for formatting the tape by inputting a desired number when a formatting mode has been discerned in step A, after carrying out the first step A.

The step A includes: a sub-step 10 for judging whether or not a file key has been input after inserting a vacant tape, a sub-step 20 for judging whether or not a formatting key has been input, a sub-step 30 for inputting a desired number when a file key has been input, a sub-step 40 for inputting a desired number during the inputting of a formatting key, and a sub-step 50 for carrying out other input modes when neither a file key nor a formatting key has been input.

The step B includes a recording routine B1 for carrying out a recording using the input file number, after the inputting of the file number and after the inputting of a file key at the step A, and a position returning routine B2 for returning the tape to the start position after carrying out the recording routine B1.

The step C includes a position detecting routine C1 for detecting the playing position of the tape at a high speed, and after carrying out the sub-step 10 and the sub-step 30 of the step A, and a file reproducing routine C2 for playing back the desired file and for rewinding the tape at a high speed after reproducing the desired file, and after carrying out the position returning detecting routine C1.

The step D includes a formatting routine D1 for recording the VISS signals on the tape for several seconds and then recording the VISS signals on the tape for several seconds at the beginning of each remaining formatted area, after the inputting of a formatting key at the first step A and the inputting of the desired formatting number (i.e., after the carrying out of the sub-steps 20 and 40) and a position restoring routine D2 for restoring the tape to the start position at a high speed, after carrying out the formatting routine D1. The desired formatting input at sub-step 40 corresponds to the number of areas the formatted tape is to be divided up into.

The method of the present invention comprising the steps A,B,C,D, and routines B1,B2, C1,C2, D1,D2) will now be described as to its operations.

First, if a tape is inserted at the step A, a discrimination is made as to whether a file key or a formatting key has been input (sub-step 10 and 20).

Upon determining that neither a file key nor a formatting key has been input, another mode is carried out. However if it is found that a filing or formatting key has been input, a desired number corresponding to a desired formatting information number is (sub-step 30 or 40).

Thus if an input of the file key is recognized by carrying out the sub-step 10, one of the next steps B and C is carried out, while if an input of the formatting key is recognized at sub-step 20; the step B is carried out.

Thus, a tape is inserted into the video tape recorder, the input of either a formatting key or a file key is recognized (sub-steps 10 and 20) and then, a number corresponding to the desired formatting number is inputted (sub-steps 30 and 40), thereby completing the step A. With respect to the file key, the number corresponds to the particular location on the formatted tape where recording/reproducing is to take place. With respect to the formatting key, the number corresponds to the number of divisions as unformatted tape is to be divided into when formatting is to be performed.

The purpose of the step D is to format a vacant tape. After carrying out the sub-step 40 of the step A, a FF mode or a REW mode is carried out at a high speed in order to judge whether the tape has been (sub-step 60).

Figure 3:
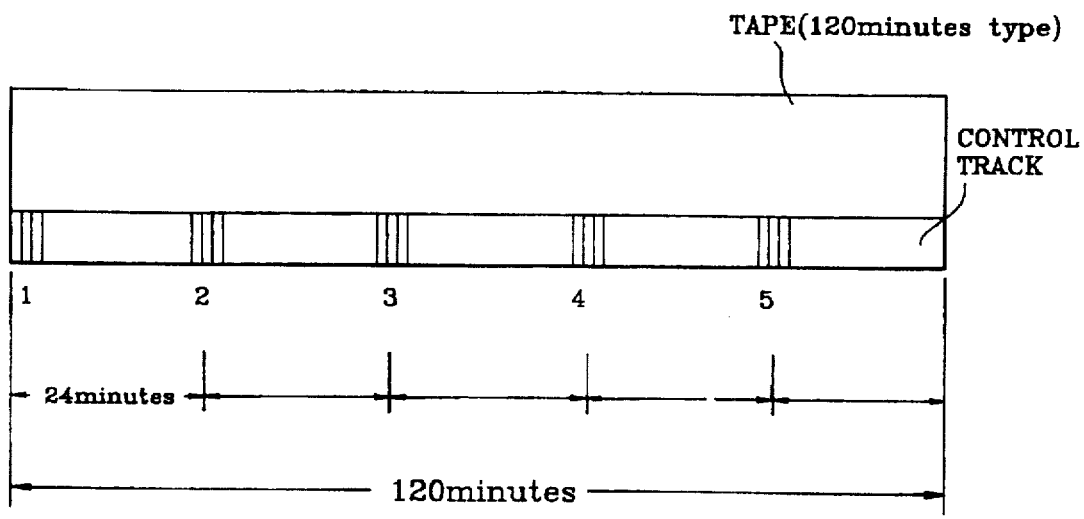
FIG. 3 illustrates a video tape formatted based on the method as shown in FIGS. 2A and 2B.

Next, a tape start sensor is detected (sub-step 70), and, when it is detected that the tape is completely rewound, VISS signals are recorded into the control track by the control head (CH) for a few seconds, e.g., 2 seconds (sub-step 80). Then a FF mode is carried out at a high speed in order to advance the tape to the end of the first region, for example, as shown in FIG. 3, if a 120-minute tape is divided into N=5 formatting regions of 24 minutes each, then at step 90 the tape is first advanced by 24 minutes so that it is at the end of the first 24 minute formatted area. This is done by dividing the total length of the tape L by N and having the VCR perform a FF operation at step 90 until the tape advances a distance equal to L/N. (sub-step 90). Then, it is detected whether or not the tape is completely at the end of the tape by a tape end sensor (sub-step 100).

If the end of the tape is not detected at the current position of the tape, the VISS signals are recorded at the beginning of the next of the N formatting regions (sub-step 80). That is, when the step D is carried out, the total length of the tape L is divided by a desired formatting number N, and, as shown in FIG. 3, the VISS signals are recorded from the starting position of the tape for approximately 2 seconds. Then the tape is rotated forward at a high speed, and the VISS signals are recorded for approximately 2 seconds at the beginning of the next of the N areas. This VISS recording operation is performed repeatedly, e.g., 5 times in FIG. 3, until the VISS signals have been recorded at the beginning of each of the N areas over the total length L of the tape thereby carrying out the formatting routine D1, where, N represents the formatting number.

After formatting the whole tape, if the end sensor of the tape is detected (sub-step 100), the tape is rewound at a high speed (sub-step 120) and, when the start sensor is detected indicating that the tape is completely rewound (sub-step 130), the running of the tape is stopped and the file reproducing routine D2 is completely carried out and the filing system is released (sub-step 150).

Thus the formatting is completed by formatting the vacant tape into N different areas where N is the predetermined number input at sub-step 40, and separate sets of information can subsequently be recorded into the N different formatted areas.

Now, referring to FIG. 2B, the second step B of recording an information under a recording reproducing mode is carried out when it is detected that a file key is inputted (sub-step 10) after inserting a formatted tape into a video tape recorder, and a desired file number is inputted (sub-step 30). The recording is carried out into the desired file of the formatted tape in accordance with the desired file number. If a REC (record) key is inputted (sub-step 160), a set play operation is carried out (sub-step 110) in order to detect whether video signals are recorded on the tape (sub-step 188). Then if video signals are recorded the tape is rotated forward at a high speed (sub-step 190) in order to detect the VISS signals of the input number (sub-step 200). That is, at step 200, VISS signals are counted and when the counted number reaches a value corresponding to the number input at sub-step 30, the tape is positioned at the user-desired recording position. Then video signals are detected again (sub-step 180) and, in the absence of the video signals, the recording is carried out (sub-step 210).

If a stop key is inputted (sub-step 220) after the completion of the recording routine B1, the tape is rewound at a high speed (sub-step 230) to detect a start sensor indicating the beginning of the tape (sub-step 240) and then, the deck of the video tape recorder is stopped (sub-step 250) in order to release the file system (sub-step 260), thereby completing the position returning routine B2 of the second step B.

Meanwhile, if a play key is inputted (sub-step 270) after the completion of sub-step 30 of the step A, the play position detecting routine C1 of the step C is carried out.

It should be noted that if there is no input play key at the sub-step 270, the system responds to another key upon receipt of such other key (sub-step 280). If there is an input play key, the tape is rewound at a high speed (sub-step 290) in order to detect a start sensor of the tape (sub-step 300), and then, the tape indicating that the tape is completely rewound is rotated forward at a high speed (sub-step 310) in order to detect VISS signals. That is, a reproduction starting position of the tape is detected (sub-step 320) by counting up VISS signals until the desired file is reached.

After the completion of the play position detecting routine C1, the file reproducing routine C2 for reproducing only the desired files on the tape is carried out.

If a desired position to be reproduced is detected at the sub-step 320, the system is put under a play mode (sub-step 330) in order to carry out the reproduction and to detect video signals (sub-step 340). If the video signals are detected, the tape is allowed to play (since it is playing back the selected program) until the VISS signals are detected (sub-step 350) indicating that the selected program is over (since the VISS signals of the succeeding formatted area have been detected. Then, the tape is rewound at a high speed (sub-step 360). Further, if video signals are not detected for a certain period of time, e.g., 2 seconds, at the sub-step 340, sub-step 369 is carried out to detect the start sensor of the tape (sub-step 370) indicating that the tape is completely rewound. Then the deck is stopped (sub-step 380), and the file system is released (sub-step 390), thereby completing the file reproducing routine C2.

Thus a vacant tape is formatted into a selected number of regions, and the respective formatting numbers are used as the identifying numbers for each region, so that it is possible to record and reproduce only the desired files. Thus, since the data on the tape is made into a filing form, the desired portion of the data can be reproduced by searching at a high speed.

Thus, the index numbers of recording and reproduction are the same, and therefore, the input/output and management of data become highly convenient, thereby greatly expanding the versatility of video tape recorders.

The invention is in no way limited to the embodiment described hereinabove. Various modifications of the described embodiment as well as other embodiments of the invention will become apparent to persons skilled in the art upon reference to the description of the invention. It is, therefore, contemplated that the appended claims will cover any such modifications or embodiments as fall within the true spirit and scope of the invention.

What is claimed is:

1. A method of formatting a videotape and recording/reproducing to/from the formatted tape, including steps of:

(a) recognizing a formatting mode, under which a blank tape is formatted, when a formatting key is received;

(b) carrying out a formatting operation, after said formatting mode is recognized in said step (a), by recording index signals at the beginning of each of a plurality of equal length areas of the tape, said plurality being determined by a user-input number;

(c) recognizing a recording/reproducing mode, under which a formatted videotape is either recorded to or reproduced from at a user-chosen location, when a file key is received;

(d) carrying out a recording operation at said user-chosen location when a record command is received, after said recording/reproducing mode is recognized in said step (c), by receiving a user-input number corresponding to said user-chosen location on the tape; and (e) carrying out a reproducing operation at said user-chosen location when a reproduction command is received, after said recording/reproducing mode is recognized in said step (c), by receiving a user-input number corresponding to said user-chosen location on the tape.

2. A method according to claim 1 wherein said step (d) includes a position restoring routine for restoring the tape to the beginning of the tape after the completion of the recording operation.

3. A method according to claim 1 wherein said step (b) includes a sub-step of detecting whether the end of the tape has been reached each time the index signals are recorded.

4. A method according to claim 3 wherein said step (b) also includes rewinding the tape back to the beginning once the end of the tape has been detected.

5. A method according to claim 1 wherein said index signals are VHS index search system (VISS) signals.

* * * * *